US007801564B2

(12) United States Patent
Chae et al.

(10) Patent No.: US 7,801,564 B2
(45) Date of Patent: Sep. 21, 2010

(54) SMART ANTENNA COMMUNICATION SYSTEM FOR SIGNAL CALIBRATION

(75) Inventors: Heon-Ki Chae, Sungnam-si (KR); Young-Hoon Kwon, Sungnam-si (KR); Jang-Hoon Yang, Sungnam-si (KR)

(73) Assignee: Samsung Electronics Co., Ltd (KR)

( * ) Notice: Subject to any disclaimer, the term of this patent is extended or adjusted under 35 U.S.C. 154(b) by 928 days.

(21) Appl. No.: 11/293,564

(22) Filed: Dec. 2, 2005

(65) Prior Publication Data

US 2006/0135211 A1 Jun. 22, 2006

(30) Foreign Application Priority Data

Dec. 2, 2004 (KR) ...................... 10-2004-0100181

(51) Int. Cl.
*H04M 1/00* (2006.01)
*H04B 17/00* (2006.01)

(52) U.S. Cl. .............. 455/562.1; 455/67.11; 455/67.14; 455/115.2

(58) Field of Classification Search .............. 455/562.1, 455/423–425, 67.11, 67.14, 67.16, 69, 575.7, 455/126, 115.1, 115.2, 9; 370/338; 342/173–174
See application file for complete search history.

(56) References Cited

U.S. PATENT DOCUMENTS

| | | | | |
|---|---|---|---|---|
| 5,499,031 | A | 3/1996 | Bodonyi | |
| 6,208,287 | B1 | 3/2001 | Sikina et al. | |
| 6,317,081 | B1 * | 11/2001 | Stilp | 342/387 |
| 6,940,453 | B2 * | 9/2005 | Kim | 342/368 |
| 7,362,266 | B2 * | 4/2008 | Collinson | 342/372 |
| 7,408,507 | B1 * | 8/2008 | Paek et al. | 342/368 |
| 2005/0047384 | A1 * | 3/2005 | Wax et al. | 370/338 |
| 2006/0111050 | A1 * | 5/2006 | Choi et al. | 455/67.11 |
| 2006/0284725 | A1 * | 12/2006 | Naguib et al. | 340/7.39 |
| 2007/0099573 | A1 * | 5/2007 | Naguib et al. | 455/67.11 |
| 2007/0099670 | A1 * | 5/2007 | Naguib et al. | 455/562.1 |

FOREIGN PATENT DOCUMENTS

| | | |
|---|---|---|
| CN | 1194741 | 9/1998 |
| EP | 1329983 | 7/2003 |
| JP | 2003-218621 | 7/2003 |
| JP | 2003-273634 | 9/2003 |
| JP | 2004-153496 | 5/2004 |
| WO | WO 97/44920 | 11/1997 |
| WO | WO 00/60757 | 10/2000 |

* cited by examiner

*Primary Examiner*—Pablo N Tran
(74) *Attorney, Agent, or Firm*—The Farrell Law Firm, LLP

(57) ABSTRACT

A calibration apparatus and method for controlling the phase and amplitude of a signal in a smart antenna multicarrier communication system are provided. A calibration signal is allocated to remaining carriers after allocating carriers to a data signal, prior to transmission. Thus, the efficiency of frequency resources for data transmission is increased.

13 Claims, 12 Drawing Sheets

SMART ANTENNA COMMUNICATION SYSTEM FOR SIGNAL CALIBRATION

PRIORITY

This application claims priority under 35 U.S.C. §119 to an application entitled "Smart Antenna Communication System For Signal Calibration" filed in the Korean Intellectual Property Office on Dec. 2, 2004 and assigned Serial No. 2004-100181, the contents of which are incorporated herein by reference.

BACKGROUND OF THE INVENTION

1. Field of the Invention

The present invention relates generally to a calibration apparatus and method for controlling the phase and amplitude of a signal in a smart antenna multicarrier communication system, and in particular, to an apparatus and method for transmitting a calibration signal on the remaining carriers after allocating data to carriers, thereby increasing the efficiency of frequency resource utilization for the data signal.

2. Description of the Related Art

A smart antenna system is a communication system that uses a plurality of antennas to automatically optimize a radiation pattern and/or a reception pattern according to a signal environment. From the perspective of data signal transmission, the smart antenna system transmits a signal with a desired strength in an intended direction at a minimum power level by beamforming. The use of the smart antenna enables a Base Station (BS) to direct a signal only to a desired Mobile Station (MS) through beamforming. Therefore, compared to omnidirectional signal transmission to all MSs, the smart antenna reduces power required for signal transmission and interference, as well. Since the smart antenna applies directionality to a transmission/received signal by actively locating an intended MS, interference to other MSs within the same cell can be minimized. Thus, the BS can allocate the remaining available power to other MSs and the reduced interference with other cells leads to the increase of BS channel capacity.

A wireless internet service system based on Orthogonal Frequency Division Multiple Access (OFDMA) uses a wide frequency bandwidth and transmits a signal from a BS to one MS at a higher power level than in a conventional system. Thus, a cell radius is small. Application of the smart antenna to the wireless internet system advantageously increases BS channel capacity.

In application of the smart antenna system to a multicarrier OFDMA system, beamforming is performed by using a beamforming weight vector for each orthogonal frequency carrier of each antenna such that each antenna beam is steered in a chosen direction. The beams must reach the antennas without any change prior to transmission over the air, but they experience distortions in their phase and amplitude due to non-linear components in the BS. Thus, calibration is needed to control the phase and amplitude of the signals. The total performance of the smart antenna technology depends on the accuracy of the calibration, that is, the accuracy of beam directionality and minimization of phase mismatch. The calibration is commonly applied to a downlink directed from a BS to an MS and an uplink directed from an MS to a BS.

FIG. 1 is a block diagram of a conventional calibration apparatus in a smart antenna system. Referring to FIG. 1, a transmission (Tx) calibration signal is transferred in the following manner. First, a calibration signal generated from a calibration processor and controller 110 under the control of other layers of the BS 109 is provided to a baseband module 108. The calibration signal is then transmitted to antennas 101 through a Radio Frequency (RF) module. The RF module oversamples the calibration signal in a Digital UpConverter (DUC) 106, modulates the oversampled signal to an RF signal in a Tx module 104, and transmits the modulated signal to the antennas 101 through a Transceiver Control Board (TCB) 103 and a coupler-splitter 102. Meanwhile, the calibration signal is coupled in the coupler-splitter 102 and transferred in a calibration path. Specifically, this calibration signal returns to the calibration processor and controller 110 through a TCB 103, a reception (Rx) module 105, and a Digital DownConverter (DDC) 107 in a Tx calibration path.

As to an Rx calibration signal, a calibration signal generated from the calibration processor and controller 110 passes through a DUC 106, a Tx module 104, and a TCB 103 in an Rx path and is coupled to signals received at the antennas 101 in a coupler-combiner 102. The coupled signal returns to the calibration processor and controller 110 through a TCB 103, an Rx module 105, a DDC 107, and the baseband module 109 in an Rx calibration path.

As described above, calibration vectors are estimated for Tx calibration and Rx calibration by computing differences in phase and amplitude between calibration signals generated from the calibration processor and controller 110 and the calibration signals fed back from the Tx and Rx paths.

FIG. 2 illustrates the principle of calibration in the conventional smart antenna system. A Tx or Rx calibration signal C(t) experiences variations in its phase and amplitude as it travels in a path running to antennas and in a feedback path. Given N antennas, the calibration signal C(t) is received from N paths. Thus, according to Equation 1:

$$
\begin{aligned}
C_1(t) &= \alpha_1 C(t) e^{j\theta_{1,cal}} e^{j\theta_{feedback}} \\
C_2(t) &= \alpha_2 C(t) e^{j\theta_{2,cal}} e^{j\theta_{feedback}} \\
&\vdots \\
C_N(t) &= \alpha_N C(t) e^{j\theta_{N,cal}} e^{j\theta_{feedback}}
\end{aligned}
\tag{1}
$$

where $C_n(t)$ denotes a feedback calibration signal from an $n^{th}$ path and $\alpha_n$ denotes attenuation in the $n^{th}$ path. $\theta_{N.cal}$ is a phase factor for $n^{th}$ path and $\theta_{feedback}$ is a phase factor for feedback path.

For calculation of a calibration vector, a coupler characteristic $R_{coupler}$ from each path must be eliminated and for beamforming, the relative phases of the N antennas must be matched. Calibration vectors are computed by Equation 2.

$$
\begin{aligned}
w_{c,1} &= conj\left[\frac{C_1(t)/R_{coupler1}}{C(t)}\right] \\
w_{c,2} &= conj\left[\frac{C_2(t)/R_{coupler2}}{C(t)}\right] \\
&\vdots \\
w_{c,N} &= conj\left[\frac{C_N(t)/R_{couplerN}}{C(t)}\right]
\end{aligned}
\tag{2}
$$

Assuming that beamforming weight vectors for antennas are $W_{b1}$, $W_{b2}$, $W_{bn}$, beamforming weight vectors calculated taking antenna paths into account are $W_{b1}W_{c1}$, $W_{b2}W_{c2}$, $W_{bn}$-$W_{cn}$.

The calibration must be performed periodically for all carriers to use the smart antenna in a multicarrier communication system such as OFDMA. This calibration requires allocation of frequency resources to a calibration signal. However, the additional frequency resource allocation for the calibration signal leads to dissipation of frequency resources and thus there is a need for a technique of solving this problem.

SUMMARY OF THE INVENTION

An object of the present invention is to substantially solve at least the above problems and/or disadvantages and to provide at least the advantages below. Accordingly, an object of the present invention is to provide an improved calibration apparatus and method for controlling the phase and amplitude of a signal in a smart antenna multicarrier communication system.

Another object of the present invention is to provide a calibration apparatus and method for transmitting a calibration signal by which to control the phase and amplitude of a signal on the remaining carriers after allocating data to carriers, thereby increasing the efficiency of frequency resource utilization for the data signal in a smart antenna multicarrier communication system.

The above objects are achieved by providing a calibration apparatus and method for controlling the phase and amplitude of a signal in a smart antenna multicarrier communication system.

According to one aspect of the present invention, in a smart antenna communication system, a scheduler allocates a data signal to a plurality of carriers as data carriers, provides the data signal to a baseband processor, and controls a calibration processor and controller to generate a calibration signal to be allocated to non-data carriers to which the data signal is not allocated. The calibration processor and controller generates the calibration signal on the non-data carriers under the control of the scheduler and calculates a calibration vector using the calibration signal and a feedback calibration signal (the calibration signal passed through a transmission path). The baseband processor calibrates a beamforming weight vector for a data signal with the calibration vector and transmits the calibrated data signal in the transmission path.

According to another aspect of the present invention, in a signal calibration method in a smart antenna communication system, a data signal is allocated to a plurality of carriers as data carriers. A calibration signal is allocated to non-data carriers to which the data signal is not allocated and transmitted in a transmission path. A calibration vector is calculated using the calibration signal and a feedback calibration signal received from the transmission path. A beamforming weight vector is calibrated for the data signal using the calibration vector and the calibrated data signal is transmitted in the transmission path.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Periodic calibration is needed for all carriers in application of a smart antenna to a multicarrier communication system like an Orthogonal Frequency Division Multiplexing (OFDM) or an Orthogonal Frequency Division Multiple Access (OFDMA) communication system.

A description will first be made of carrier allocation to data in such a communication system.

Figure 3:
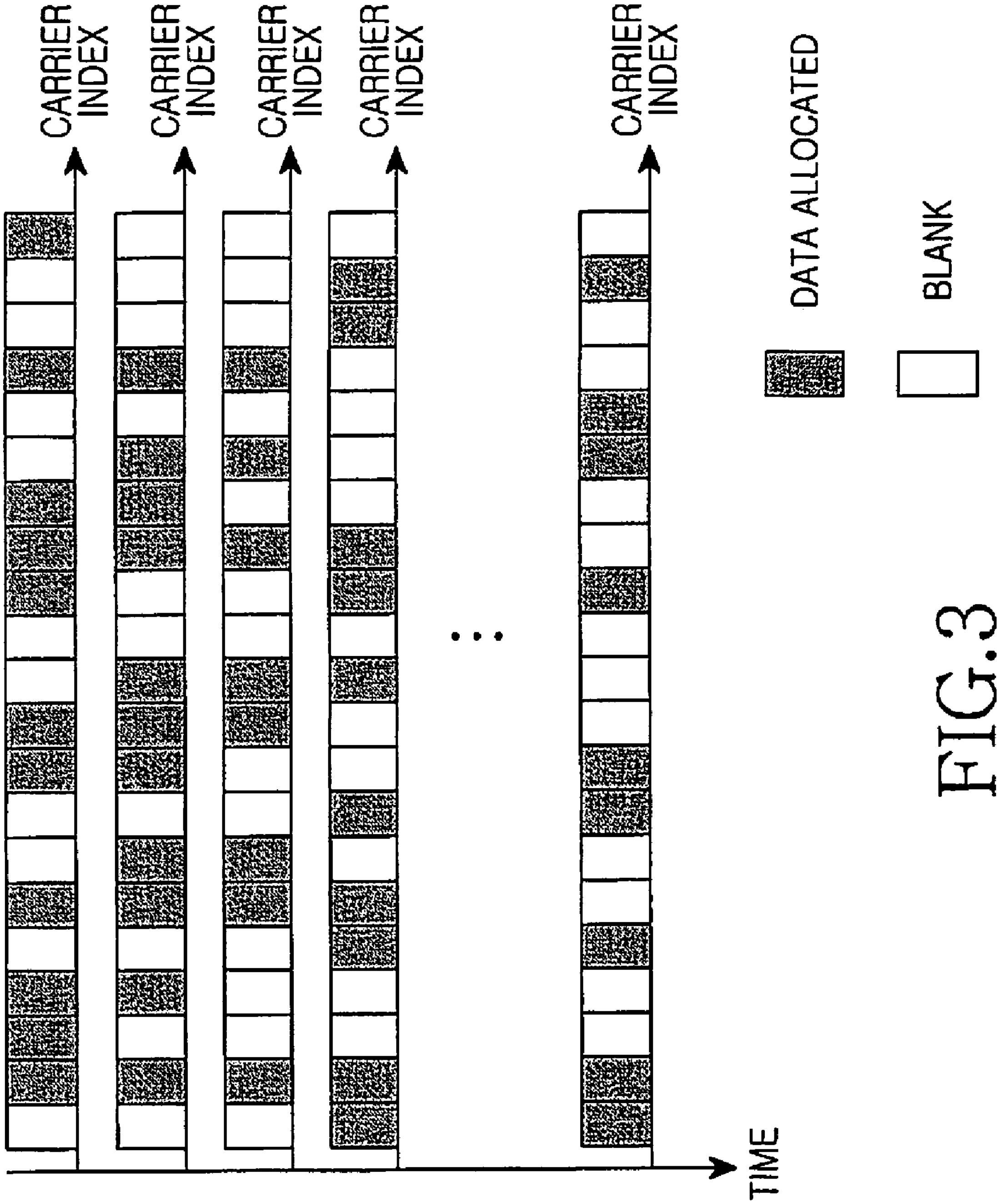
FIG. 3 illustrates allocation of carriers to a data signal in a smart-antenna communication system according to the present invention.

FIG. 3 illustrates allocation of carriers to a data signal in a smart-antenna communication system according to the present invention. Referring to FIG. 3, shaded squares denote areas with data signals and blank squares denote areas without data signals, some of which are allocated to a calibration signal. An example of allocating carriers to data over time is shown herein. As different MSs are connected to a BS with passage of time, the allocation of frequency resources to data changes correspondingly, and carriers without data also change with passage of time, as well.

It is possible to calibrate carriers without data by mapping a calibration signal to the non-data carriers. Continuous calibration of the non-data carriers for a predetermined period of time leads to calibration across a total frequency band. For efficient calibration of the total frequency band, therefore, the non-data carriers must be uniformly distributed across the total frequency band. In addition, unless a specific carrier to which the calibration signal was allocated has the calibration signal applied again a predetermined time later (Time_threshold), the calibration signal must be forcedly allocated to the carrier so that the calibration signal is allocated across the total frequency band periodically.

Figure 1:
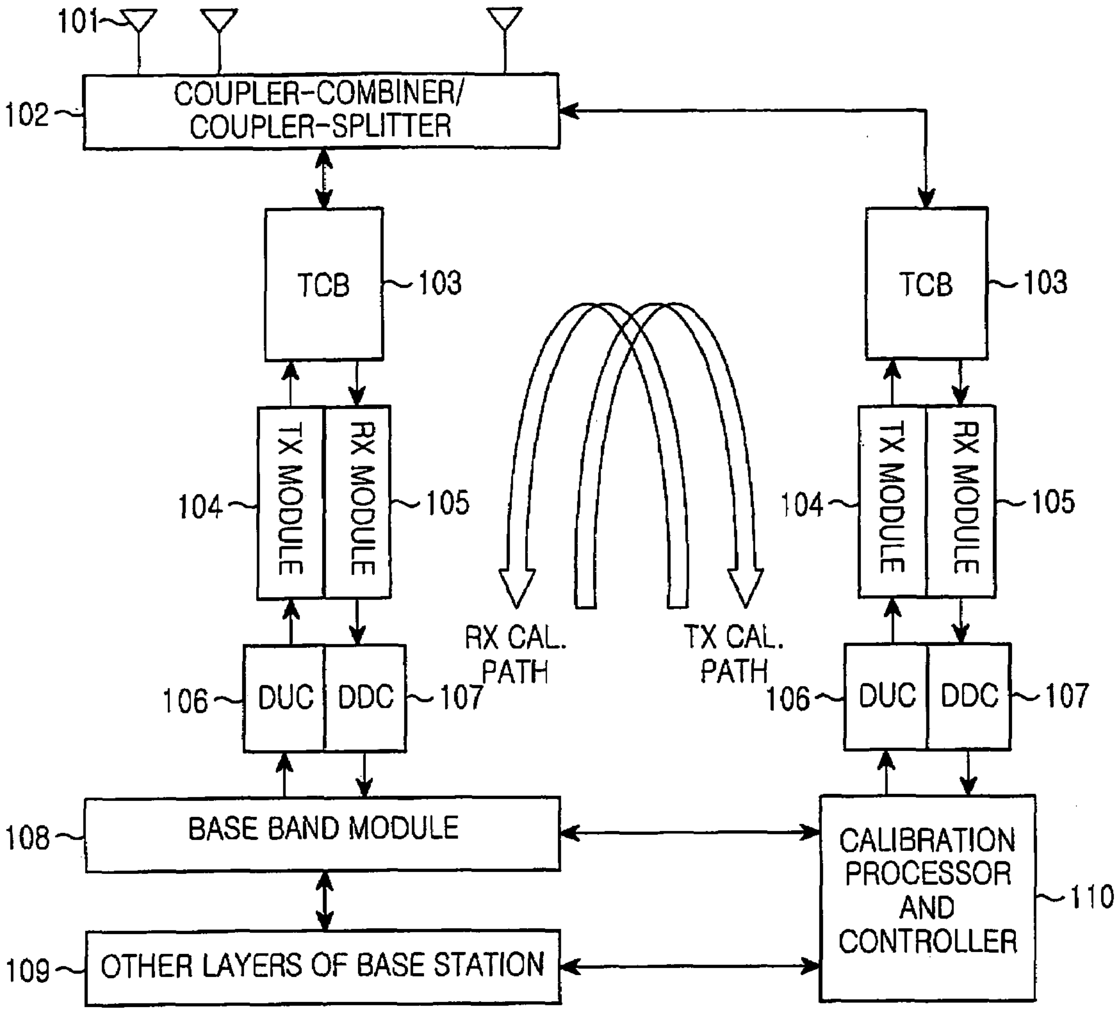
FIG.1 PRIOR ART
FIG. 1 is a block diagram of a conventional signal calibration apparatus in a smart-antenna communication system.
Figure 2:
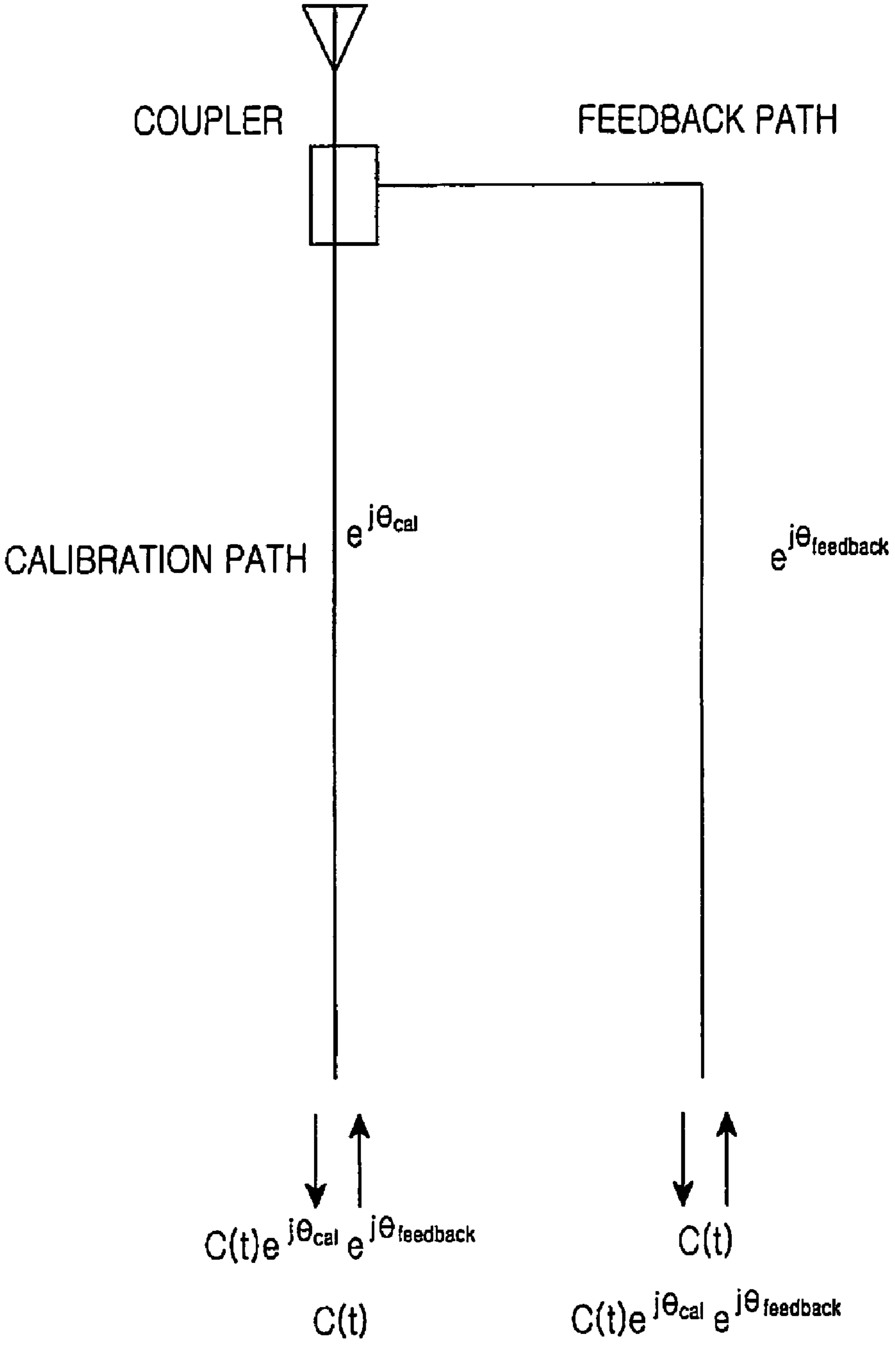
FIG.2 PRIOR ART
FIG. 2 illustrates the principle of signal calibration in the smart-antenna communication system.
Figure 4:
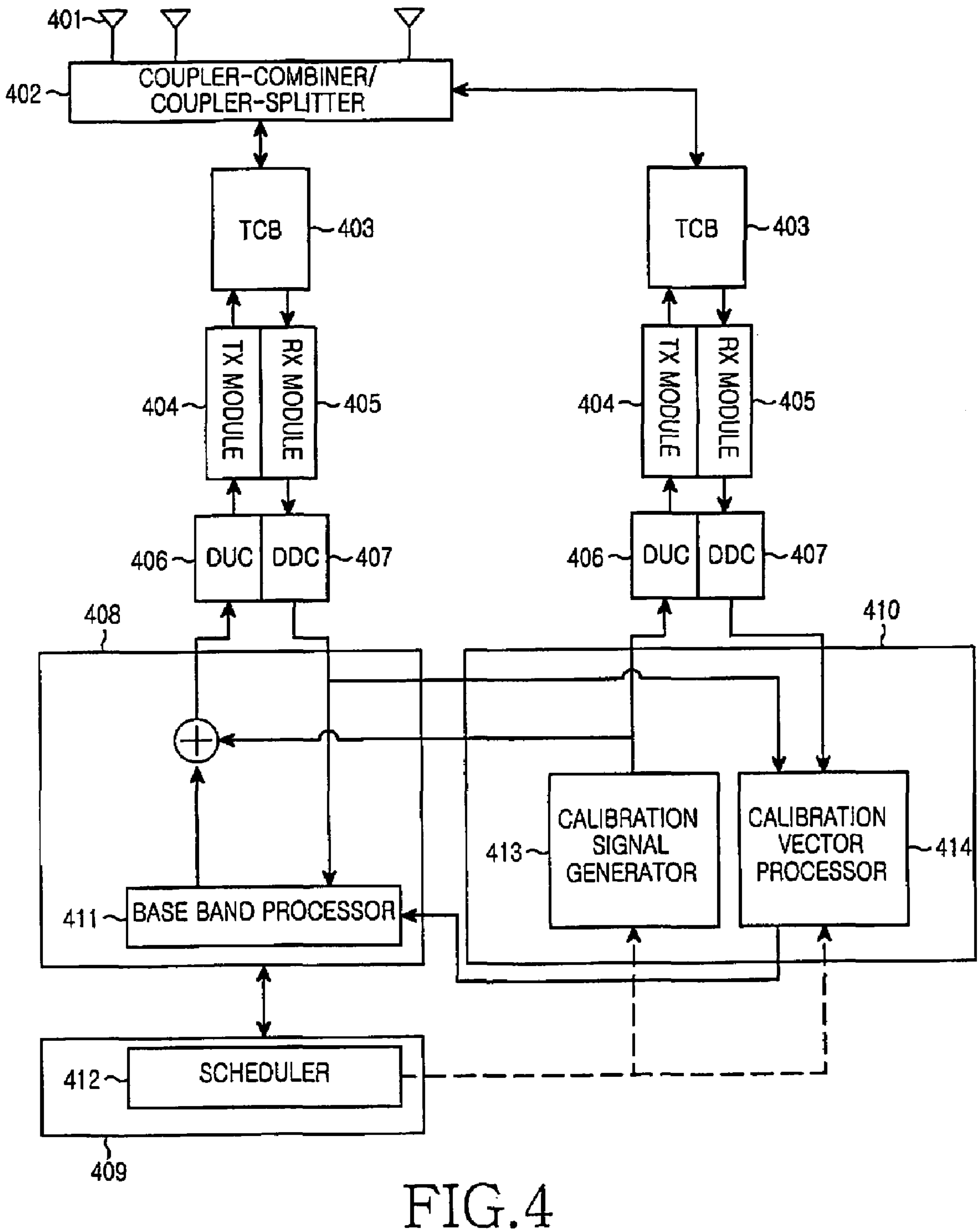
FIG. 4 is a block diagram of a calibration apparatus in a smart antenna system according to the present invention.

FIG. 4 is a block diagram of a calibration apparatus in a smart antenna system according to the present invention. Referring to FIG. 4, reference numerals 401 to 410 denote the same components 101 to 110 illustrated in FIG. 1. Reference numerals 411 to 414 denote components further provided according to the present invention, for allocating a calibration signal to carriers and estimating calibration vectors. A scheduler 412 allocates a data signal to carriers taking into account calibration in each symbol and provides the data signal to a baseband processor 411. The scheduler 412 also controls a calibration signal generator 413 and a calibration vector processor 414. Specifically, the scheduler 412 controls the calibration signal generator 413 to generate the calibration signal on non-data carriers and controls the calibration vector processor 414 to compute a calibration vector using a feedback calibration signal that has passed through a feedback path. This calibration signal is transmitted/received for Tx calibration and Rx calibration in the same manner as illustrated in FIG. 1.

Figure 5:
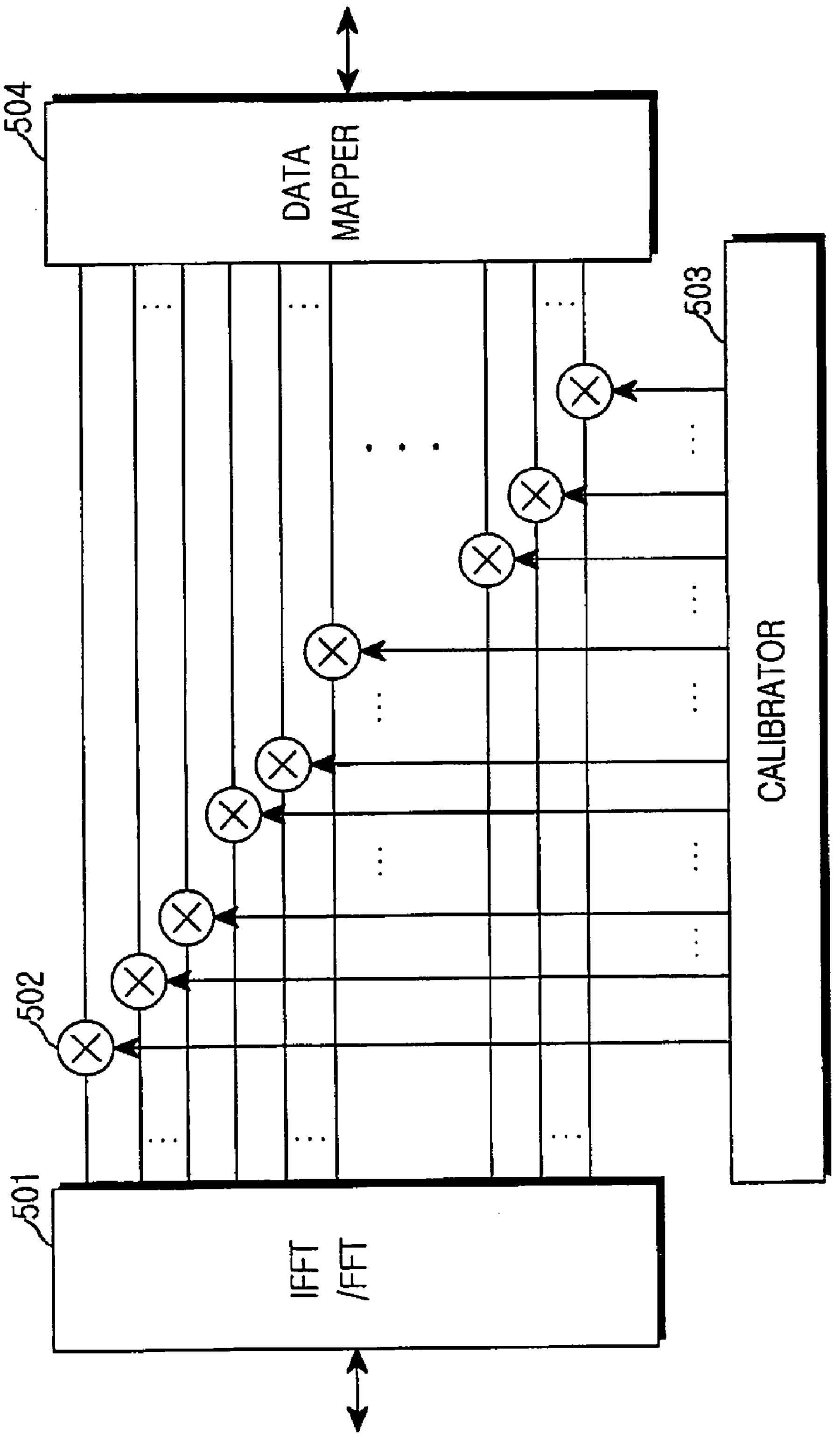
FIG. 5 illustrates the configuration of a baseband processor in the smart antenna system according to the present invention.

FIG. 5 illustrates the configuration of the baseband processor 411 in the smart antenna system according to the present invention. Referring to FIG. 5, the baseband processor 411 in the baseband module 408 receives calibration vectors from the calibration vector processor 414 of the calibration processor and controller 410. In a Tx path from the BS to an MS, a data mapper 504 maps non-data carriers to multipliers 502. A calibrator 503 provides the calibration vectors to multipliers 502. The multipliers 502 multiply the carrier signals with the calibration vectors and an inverse fast Fourier transform (IFFT)/FFT processor 501 modulates the products by IFFT.

In an Rx path from the MS to the BS, the above operation for the Tx path is reversed. The IFFT/FFT 501 demodulates a received data signal by FFT. The calibrator 503 applies the calibration vectors received from the calibration vector processor 414 to the FFT signals.

Figure 6:
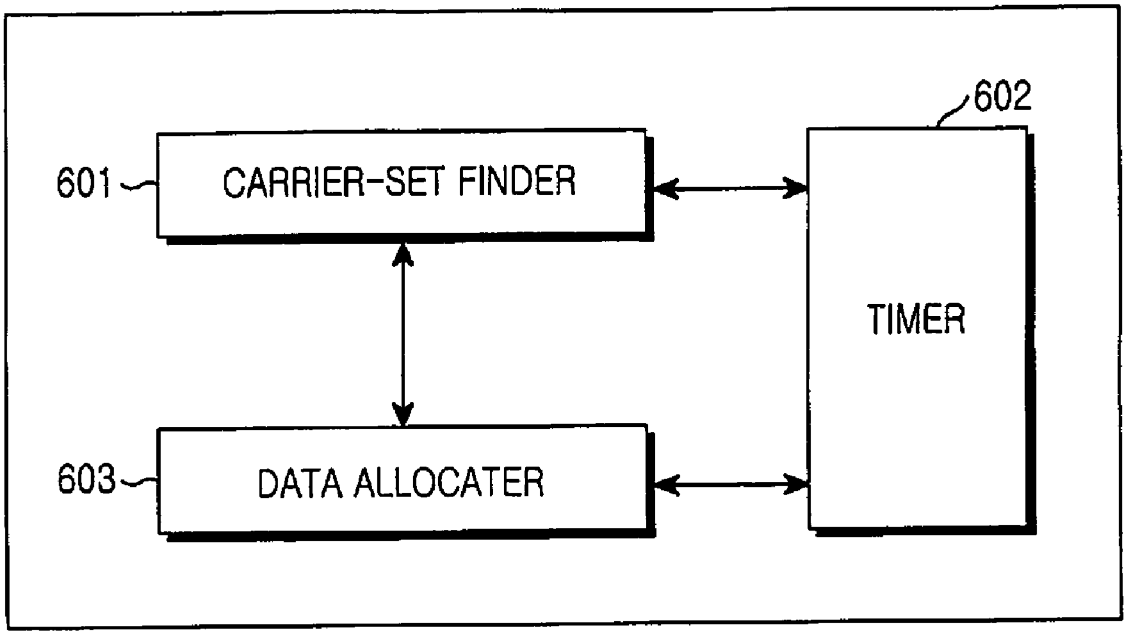
FIG. 6 is a block diagram of a scheduler in the smart antenna system according to the present invention.

FIG. 6 is a block diagram of the scheduler 412 in the smart antenna system according to the present invention. Referring to FIG. 6, the scheduler 412 functions to allocate a calibration signal to carriers by controlling the calibration signal generator 413. A carrier-set finder 601 finds carriers whose timer values do not exceed a threshold (Time_threshold) as data carriers to which data can be allocated. A data allocater 603 allocates data to the carriers found by the carrier-set finder 601. A timer 602 updates its timer value for a corresponding data carrier to which the data allocater 603 has allocated data.

Figure 7:
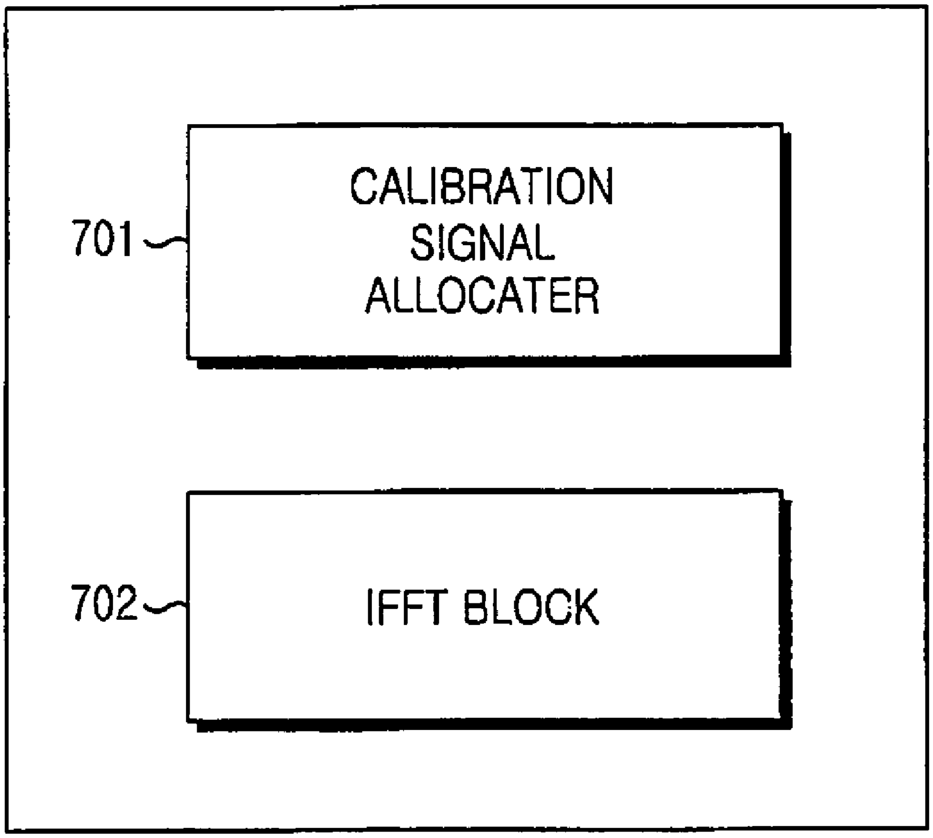
FIG. 7 is a block diagram of a calibration signal generator in the smart antenna system according to the present invention.

FIG. 7 is a block diagram of the calibration signal generator 413 in the smart antenna system according to the present invention. Referring to FIG. 7, the calibration signal generator 413 includes a calibration signal allocater 701 and an IFFT processor 702. The calibration signal allocater 701 allocates a calibration signal to non-data carriers based on carrier-data allocation information received from the scheduler 412. The IFFT processor 702 modulates the calibration carrier signals by IFFT.

Figure 8:
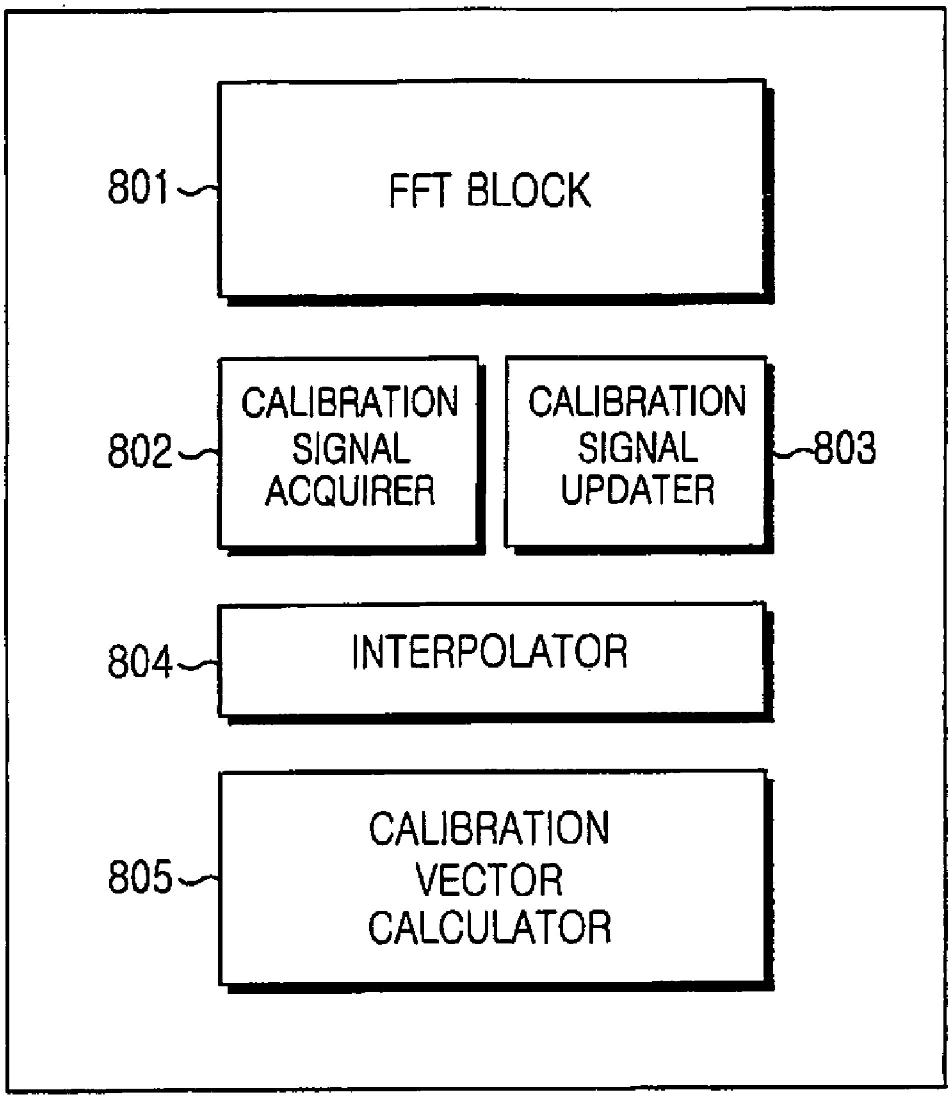
FIG. 8 is a block diagram of a calibration vector processor in the smart antenna system according to the present invention.

FIG. 8 is a block diagram of the calibration vector processor 414 in the smart antenna system according to the present invention. Referring to FIG. 8, the calibration vector processor 414 includes an FFT processor 801, a calibration signal acquirer 802, a calibration signal updater 803, an interpolator 804, and a calibration vector calculator 805. The FFT processor 801 separates a feedback calibration signal by carriers. The calibration signal acquirer 802 measures the phase and amplitude of the feedback calibration signals of calibration carriers according to calibration carrier position information received from the scheduler 412. The calibration signal updater 803 updates the phase and amplitude information each time and stores it in a memory. The interpolator 804 interpolates the stored phase and amplitude information, thereby estimating the phases and amplitudes of the calibration signal on carriers to which the calibration signal was not allocated. The interpolation is carried out in the case where a large number of MSs are connected to the BS. The calibration vector calculator 805 calculates calibration vectors after eliminating coupler characteristics from the feedback calibration signal.

Figure 9:
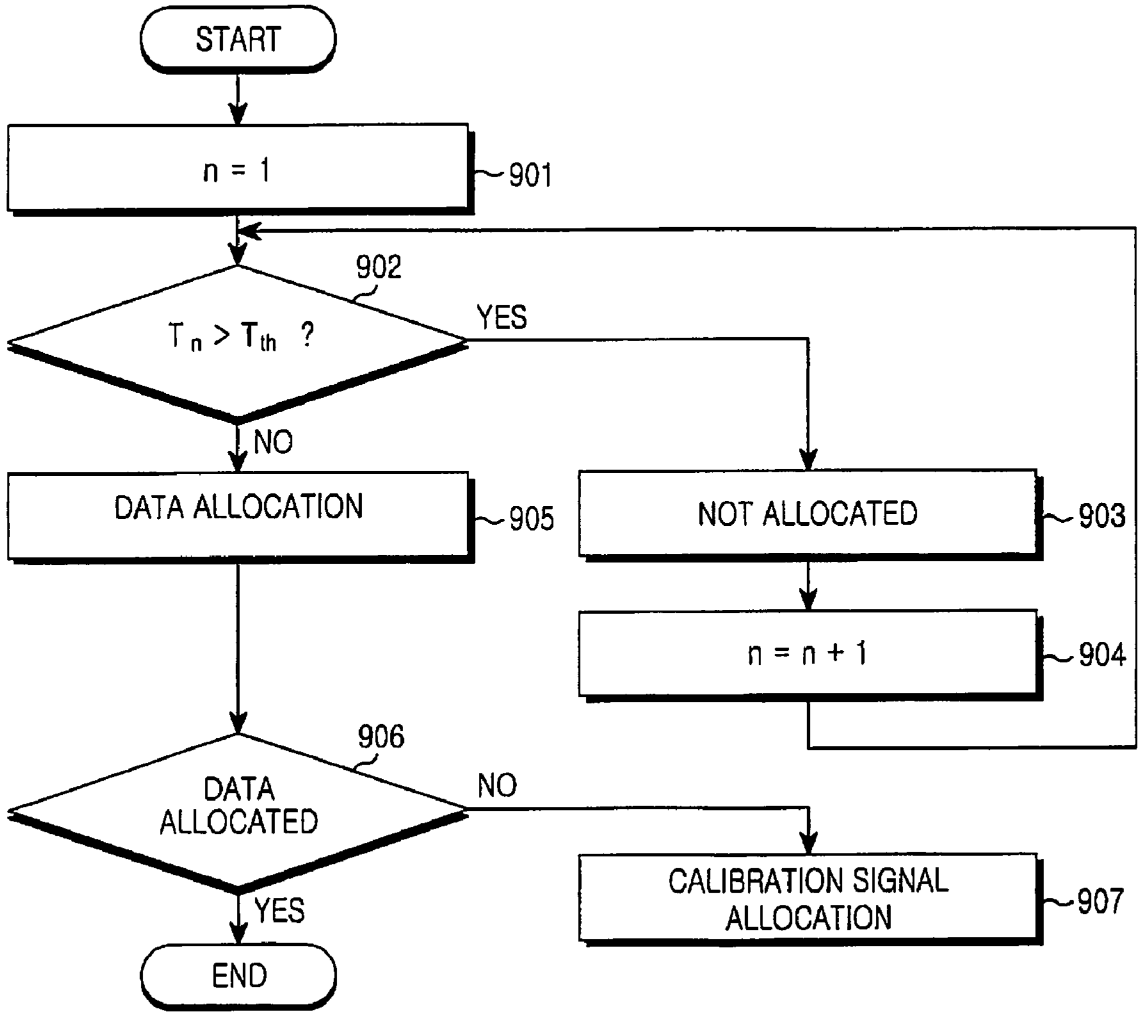
FIG. 9 is a flowchart illustrating an operation for allocating carriers to a calibration signal in the smart antenna system according to the present invention.

FIG. 9 is a flowchart illustrating an operation for allocating carriers to a calibration signal in the smart antenna system according to the present invention. Referring to FIG. 9, a timer for each carrier is reset to 0 before the BS operates. A variable n indicating a carrier is set to 1 in step 901. In step 902, the timer value of the $n^{th}$ carrier is compared with a timer threshold (Time_threshold). If timer value of the $n^{th}$ carrier is greater than the threshold, the $n^{th}$ carrier is excluded as unavailable as a data carrier in step 903. In this case n is updated to n+1 in step 904 and returned to step 902. On the other hand, if timer value of the $n^{th}$ carrier is not greater than the threshold, the $n^{th}$ carrier may be data carriers in step 905. Because the data is not allocated to all data carriers, carriers for which the data is not allocated may exist. In step 906, it is confirmed whether data is allocated. If data is not allocated, then a calibration signal is allocated to such a non-data carrier in step 907. A symbol having the calibration signal and the data signal is then transmitted.

Figure 10:
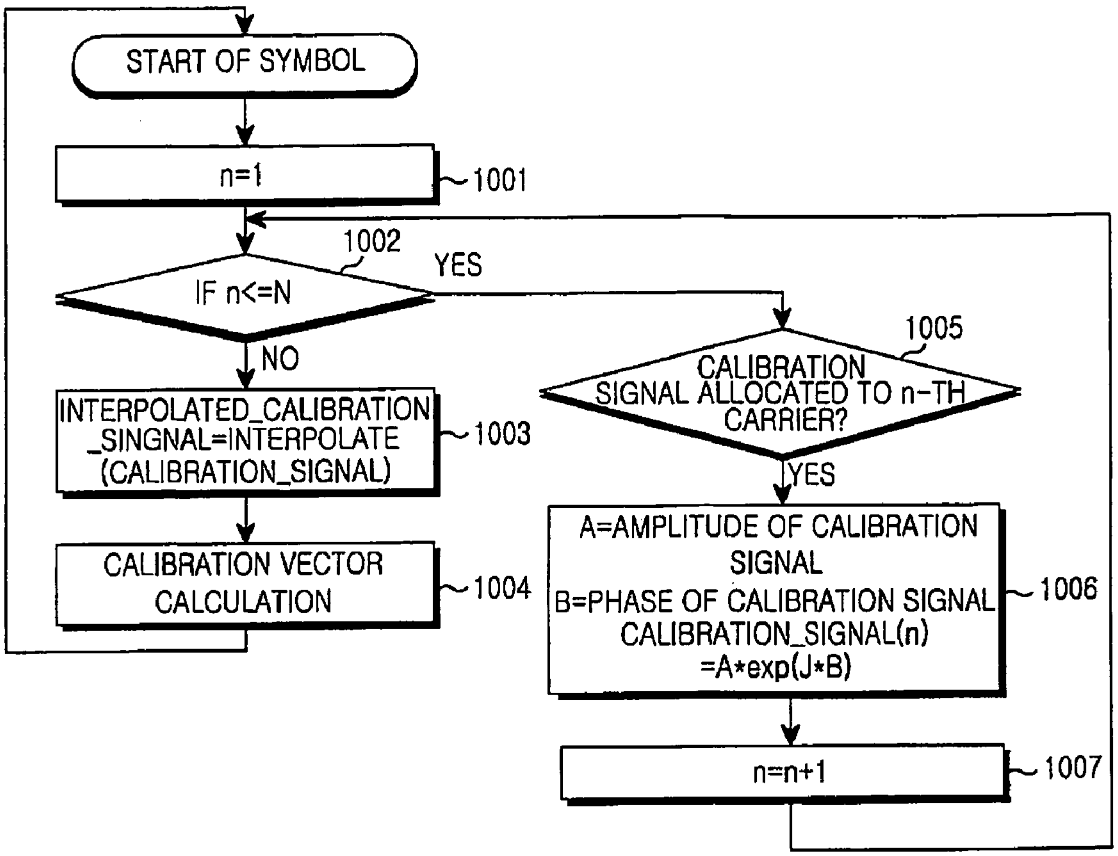
FIG. 10 is a flowchart illustrating an operation for estimating a calibration vector in the smart antenna system according to the present invention.

FIG. 10 is a flowchart illustrating an operation for estimating a calibration vector in the smart antenna system according to the present invention. Referring to FIG. 10, a variable n indicating a carrier is set to 1 in step 1001. If $n^{th}$ is less than N (total number of carriers), it is confirmed in step 1005 whether a calibration signal was allocated to $n^{th}$ carrier. If a calibration signal was allocated to the $n^{th}$ carrier, then the calibration signal response on the calibration carriers is received and the phase and amplitudes of the calibration carriers are stored in a memory in step 1006. For an $n^{th}$ carrier, if it carries the calibration signal, the memory, which has already stored the phases and amplitudes of previous calibration carriers, is updated with the phase and amplitude of the calibration signal on the $n^{th}$ carrier at an $n^{th}$ address. In step 1007, this operation is repeated for all carriers. Then the calibration signals are interpolated using the stored phases and amplitudes of the calibration carriers in step 1003. After eliminating coupler characteristics from the calibration signal, a calibration vector is computed for each carrier in step 1004.

Figure 11A:
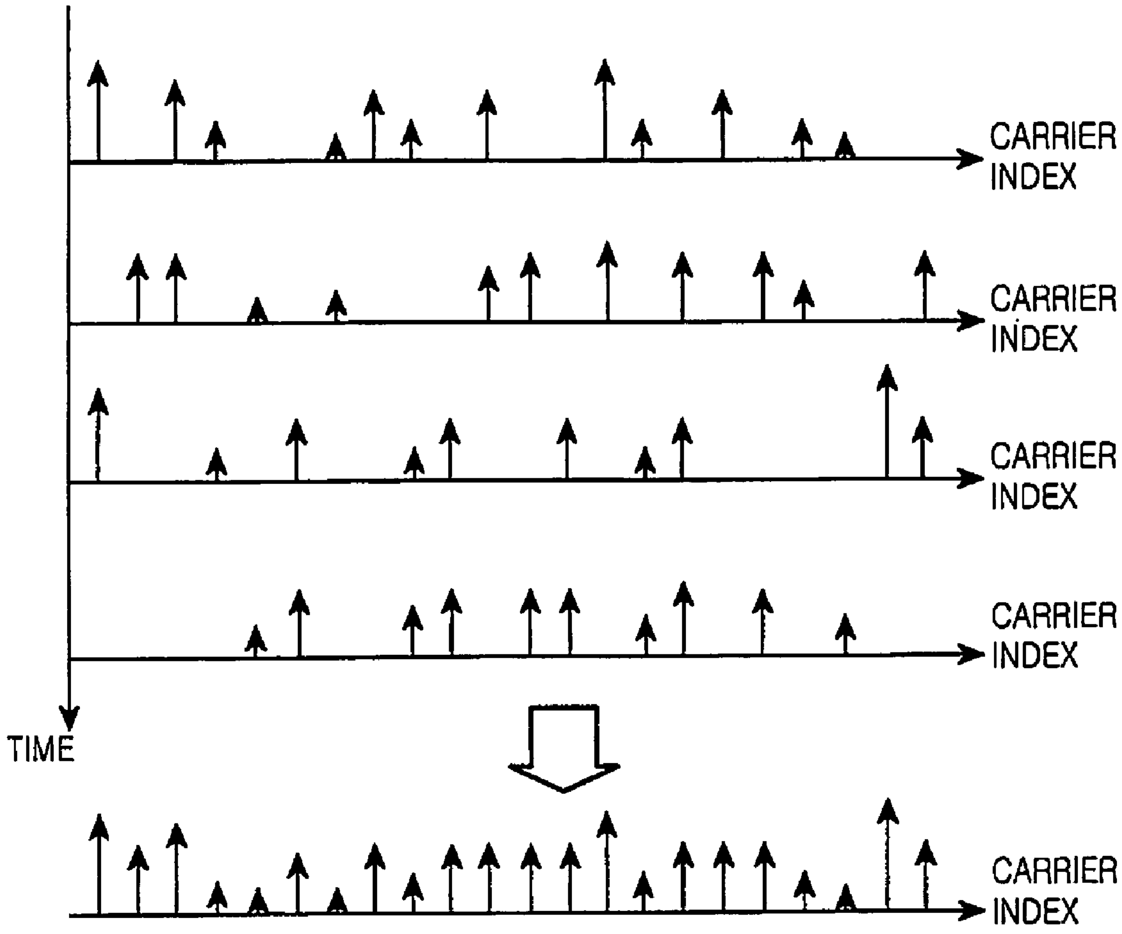
FIGS. 11A and 11B illustrate the values of feedback calibration signals in the smart antenna system according to the present invention.
Figure 11B:
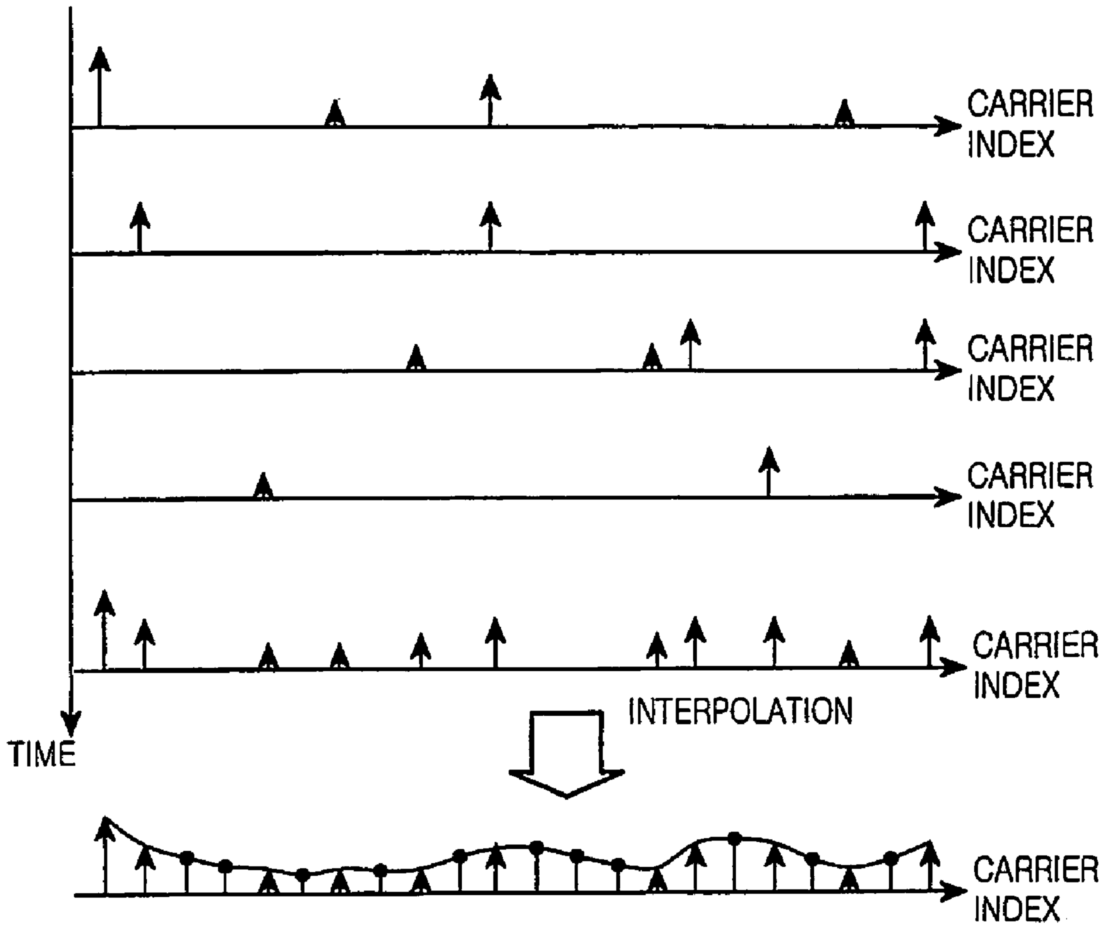

FIGS. 11A and 11B illustrate the values of feedback calibration signals in the smart antenna system according to the present invention. In the illustrated case of FIG. 11A, a calibration signal is transmitted for a predetermined time of period and fed back. By storing the feedback calibration signals received for the period of time, a signal can be calibrated across a total frequency band. Since the system knows the phase and amplitude of the transmitted calibration signal, it can compute calibration vectors by comparing the value of the transmitted calibration signal with that of the feedback calibration signal. Thus, the phase and amplitude of a signal can be calibrated using the calibration vectors. In the case where a small number of users are connected to a BS, this method is applicable.

In the illustrated case of FIG. 11B, the calibration signal is not transmitted across the total frequency band and thus the values of feedback calibration signals are estimated by interpolation. This method is available when a large number of users are connected to the BS and more data carriers are needed. Also, since the system knows the phase and amplitude of the transmitted calibration signal, it can compute calibration vectors by comparing the value of the transmitted calibration signal with that of the feedback calibration signal. Thus, the phase and amplitude of a signal can be calibrated using the calibration vectors.

In accordance with the present invention as described above, a calibration signal is allocated to the remaining carriers after allocating carriers to a data signal, prior to transmission in a smart antenna multicarrier communication system. Thus, the efficiency of frequency resources for data transmission is increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A smart antenna communication system comprising:

a scheduler for allocating a data signal to a plurality of carriers, providing the data signal to a baseband processor, and controlling a calibration processor and controller;

the calibration processor and controller for allocating a calibration signal on non-data carriers to which the data signal is not allocated under the control of the scheduler, and calculating a calibration vector using the calibration signal and a feedback calibration signal, being the calibration signal passed through a transmission path; and the baseband processor for calibrating a beamforming weight vector for the data signal with the calibration vector and transmitting the calibrated data signal in the transmission path.

2. The smart antenna communication system of claim 1, wherein the calibration processor and controller comprises:

a calibration signal generator for generating the calibration signal on the non-data carriers under the control of the scheduler; and a calibration vector processor for calculating the calibration vector using the calibration signal and the feedback calibration signal.

3. The smart antenna communication system of claim 2, wherein the calibration signal generator comprises:

a calibration signal allocater for allocating the calibration signal to the non-data carriers according to carrier-data allocation information received from the scheduler; and an IFFT processor for modulating the calibration signal received from the calibration signal allocater by IFFT.

4. The smart antenna communication system of claim 2, wherein the calibration vector processor comprises:

a fast Fourier transform (FFT) processor for separating the feedback calibration signal by carriers;

a calibration signal acquirer for measuring phases and amplitudes of the calibration signal on the non-data carriers to which the calibration signal is allocated, based on calibration carrier position information received from the scheduler;

a calibration signal updater for updating a memory with the phase and amplitude measurements; and a calibration vector calculator for eliminating coupler characteristics from the phase and amplitude measurements stored in the memory and calculating a calibration vector using the coupler characteristics from phase and amplitude measurements.

5. The smart antenna communication system of claim 4, further comprising an interpolator for estimating the phases and amplitudes of the calibration signal on carriers to which the calibration signal is not allocated by interpolating the phase and amplitude measurements stored in the memory, and storing the estimated phases and amplitudes of the calibration signal in the memory.

6. The smart antenna communication system of claim 1, wherein the scheduler comprises:

a carrier-set finder for finding carriers having timer values not exceeding a threshold as data carriers;

a data allocater for allocating the data signal to the data carriers; and a timer for updating timer values for the data carriers.

7. The smart antenna communication system of claim 1, wherein the baseband processor comprises:

a data mapper for receiving the data signal allocated to the data carriers by the scheduler;

a calibrator for applying the calibration vector received from the calibration vector processor to the data signal; and an inverse fast Fourier transform (IFFT) processor for modulating the data signal received from the calibrator by IFFT.

8. The smart antenna communication system of claim 1, wherein the smart antenna communication system is an Orthogonal Frequency Division Multiplexing (OFDM) or an Orthogonal Frequency Division Multiple Access (OFDMA) communication system.

9. A signal calibration method in a smart antenna communication system, comprising the steps of:

allocating a data signal to a plurality of carriers;

allocating a calibration signal on non-data carriers to which the data signal is not allocated and transmitting the calibration signal in a transmission path;

calculating a calibration vector using the calibration signal and a feedback calibration signal received from the transmission path; and calibrating a beamforming weight vector for the data signal using the calibration vector and transmitting the calibrated data signal in the transmission path.

10. The signal calibration method of claim 9, wherein the calibration signal allocation and transmission step comprises:

allocating the calibration signal to the non-data carriers; and modulating the allocated calibration signal.

11. The signal calibration method of claim 9, wherein the calibration and transmission step comprises:

receiving the data signal on each of the data carriers;

applying the calibration vector to the data signal; and modulating the data signal to which the calibration vector is applied.

12. The signal calibration method of claim 9, wherein the calculation step comprises the steps of:

separating the feedback signal by carriers;

measuring phases and amplitudes of the calibration signal on the non-data carriers to which the calibration signal is allocated based on calibration carrier position information;

updating a memory with the phase and amplitude measurements; and eliminating coupler characteristics from the phase and amplitude measurements stored in the memory and calculating a calibration vector using the coupler characteristics-free from phase and amplitude measurements.

13. The signal calibration method of claim 12, wherein the memory updating step comprises estimating the phases and amplitudes of the calibration signal on carriers to which the calibration signal is not allocated by interpolating the phase and amplitude measurements stored in the memory, and storing the estimated phases and amplitudes of the calibration signal in the memory.

* * * * *